H. C. JOHANSEN.
DRILL FEEDING MECHANISM.
APPLICATION FILED APR. 17, 1918.
1,418,080.
Patented May 30, 1922.
2 SHEETS—SHEET 2.
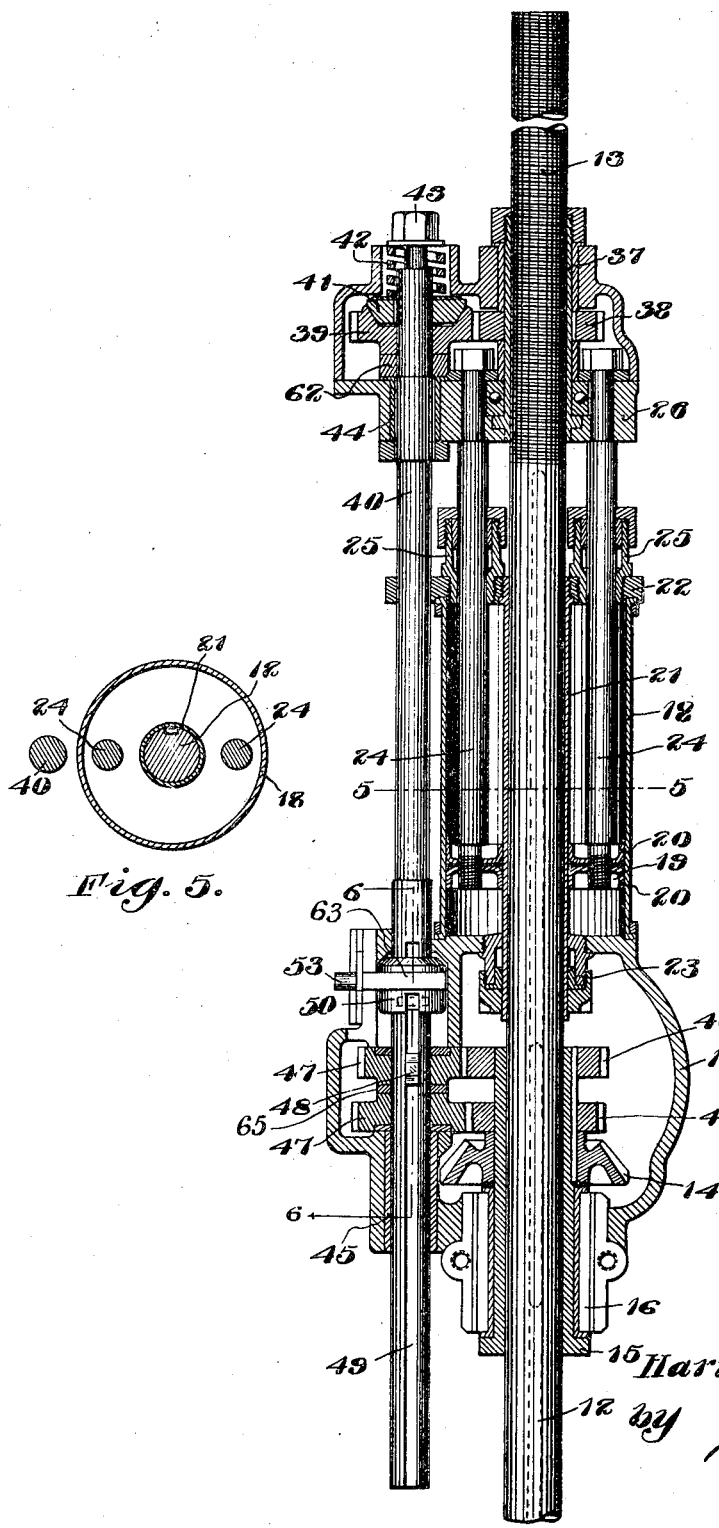
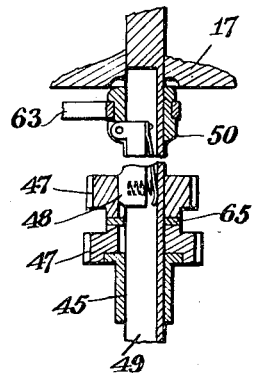
Fig. 6.
Fig. 5.
Fig. 4.
Inventor:
Harry C. Johansen.
by
att'y.

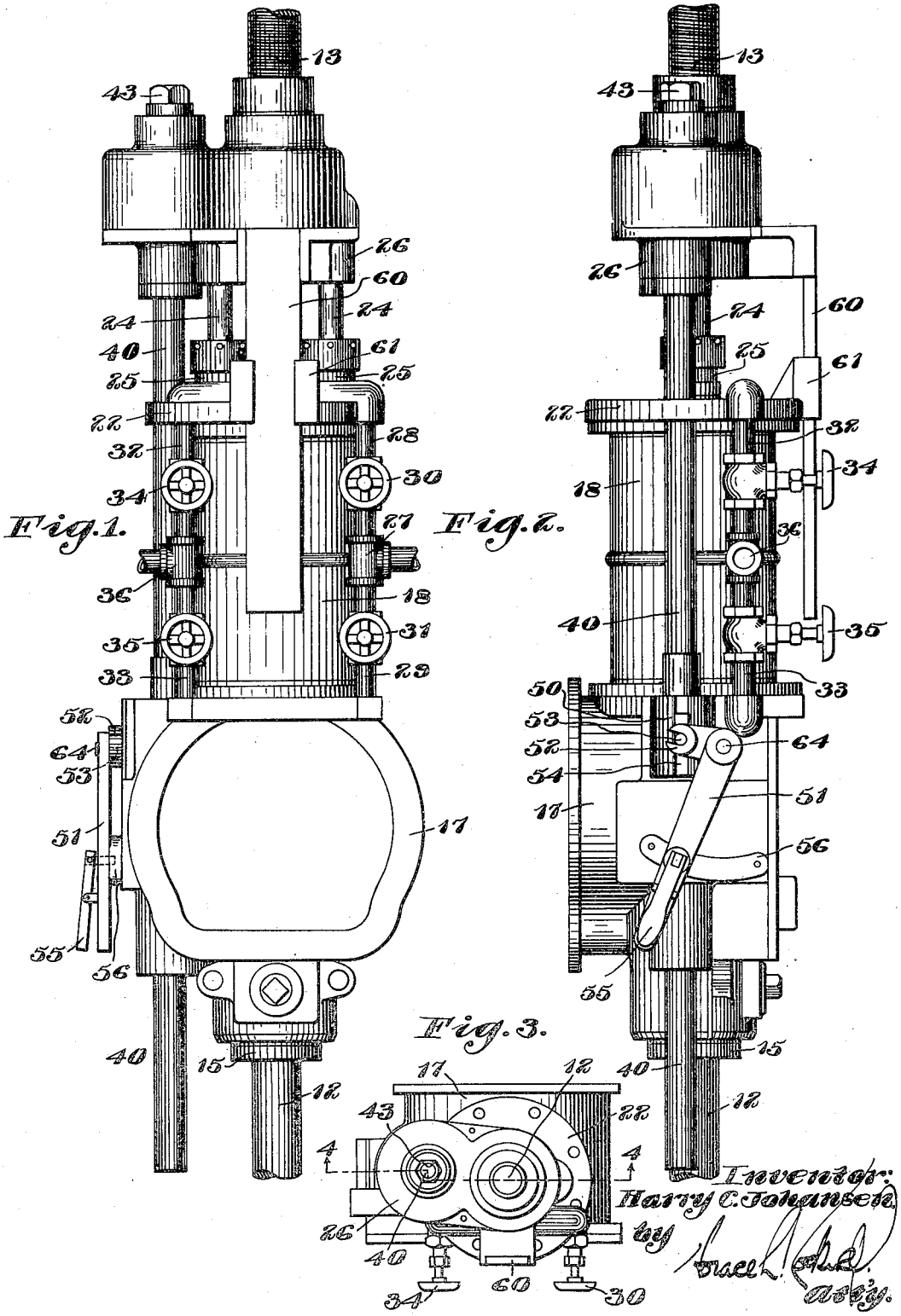

UNITED STATES PATENT OFFICE.

HARRY C. JOHANSEN, OF CHICAGO, ILLINOIS, ASSIGNOR TO SULLIVAN MACHINERY COMPANY, A CORPORATION OF MASSACHUSETTS.

DRILL FEEDING MECHANISM.

1,418,080.   Specification of Letters Patent.   Patented May 30, 1922.

Application filed April 17, 1918. Serial No. 229,163.

*To all whom it may concern:*

Be it known that I, HARRY C. JOHANSEN, a citizen of the United States, residing at Chicago, in the county of Cook and State of Illinois, have invented certain new and useful Improvements in Drill Feeding Mechanisms, of which the following is a full, clear, and exact specification.

This invention relates to feeding mechanism for drills, especially adapted to use in connection with core rock drills, although not necessarily limited in its utility to tools or machines of this particular type.

The invention has for one of its objects to provide an improved feeding mechanism for drills of a sufficiently flexible character to permit of considerable variation in the rate of feed in accordance with the requirements of the work, thereby permitting a convenient use of the apparatus in formations involving marked and abrupt changes in relative hardness.

Another object of the invention is to provide feeding mechanism for drills in which the respective advantages of a screw feed and a hydraulic feed are combined in a single apparatus.

A further object of the invention is to provide a combined screw and hydraulic feeding mechanism for drills, in which either the screw feed or the hydraulic feed may be independently controlled, permitting either to be used alone or in conjunction with the other.

Other objects of the invention will be apparent in the course of the appended specification and claims.

In the accompanying drawings I have shown for purposes of illustration one form which my invention may assume in practice.

In said drawings,—

Fig. 1 is a front elevation, Fig. 2 a side elevation, and Fig. 3 a plan view, of the complete apparatus.

Fig. 4 is a vertical section on the line 4—4 of Fig. 3.

Fig. 5 is a horizontal section through the feeding cylinder taken substantially on line 5—5 of Fig. 4.

Fig. 6 is a vertical section on the line 6—6 of Fig. 4, showing a detail of construction.

Referring to the drawings, 12 denotes the usual drive rod having a threaded upper end 13 and carrying at its lower end a core drill (not shown) of any suitable type. The drive rod 12 is rotated from the usual driving mechanism (not shown) through a bevel gear 14 (see Fig. 4) fast upon a sleeve 15 keyed or otherwise slidably secured to the shaft 12 and journaled in a bearing 16 carried by a casing or support 17 which, as herein shown, is the usual swivel head of the apparatus. Mounted on the swivel head 17 is a cylinder 18 in which reciprocates a piston 19 provided with suitable packing 20. Extending longitudinally through the cylinder 18 and piston 19 is a sleeve 21 in which the drive rod 12 is journaled, said sleeve and drive rod being arranged concentric with said cylinder and piston, and said sleeve being secured at its upper end to the upper cylinder head 22, and passing at its lower end through a stuffing box 23 carried by the upper wall of the casing or swivel head 17, which wall constitutes the lower head of the cylinder 18. The piston 19 is preferably provided with two piston rods 24 connected at diametrically opposite points to said piston, said piston rods passing through suitable stuffing boxes 25 in the upper cylinder head 22 and carrying at their upper ends a crosshead 26. The vertical movement of the crosshead 26 may, if desired, be guided or steadied by means of a slide 60 secured to and depending from said crosshead, said slide moving in a suitable guide 61 on the cylinder head 22. Motive fluid, preferably water under a sufficient hydrostatic head, is supplied to the cylinder 18 through a fitting 27 (see Fig. 1), to which may be attached a pipe or hose (not shown) leading from any suitable source. The fitting 27 communicates through pipes 28 and 29 with the upper and lower ends, respectively, of said cylinder, said pipes being independently controlled by inlet valves 30 and 31. The upper and lower ends, respectively, of said cylinder are exhausted through pipes 32 and 33 controlled by manually operated valves 34 and 35 and communicating with a fitting 36 from which the exhaust fluid may be conducted through a suitable pipe (not shown) to any desired point.

Journaled in the crosshead 26 is a feed nut or threaded sleeve 37 engaging the threaded end 13 of the drive rod 12. Secured to the feed nut or sleeve 37, for rotation therewith, is a gear 38 which meshes with a gear 39 loosely mounted on a transmission shaft 40 but held against longitudinal movement thereon by a collar 62. Said gear 39 is normally frictionally connected with the shaft 40 by means of a friction device comprising a clutch member 41 rotating with said shaft but axially movable thereon, said clutch member having a friction clutch face which is pressed into engagement with a cooperating clutch face on the gear 39 by means of a spring 42, the tension of which is adjustable by means of a nut 43 on the upper threaded end of the shaft 40. The transmission shaft 40 is arranged parallel to the drive rod 12 and is journaled at its upper end in a bearing 44 carried by the crosshead 26. Said shaft is also journaled, adjacent its lower end, in a bearing 45 carried by the support or swivel head 17 and at an intermediate point in the cylinder head 22, said shaft being longitudinally movable in the two last named bearings in order to permit the same to move vertically with the crosshead 26. The transmission shaft 40 is operatively connected with the drive rod 12 for rotation thereby through the medium of variable transmission gearing comprising a suitable number (herein two) of gears 46 fast upon the sleeve 15 within the casing or swivel head 17 and meshing with corresponding gears 47 loosely mounted on the shaft 40 but adapted to be selectively connected thereto for rotation therewith by means of a key or spline 48 slidably mounted in a groove 49 in the shaft 40 and carried by a collar 50 loosely mounted on said shaft. The collar 50 may be manually adjusted, to cause the key 48 to connect any desired gear 47 with the shaft 40, by means of a manually operable lever 51 (see Figs. 1 and 2), on the exterior of the casing or swivel head 17, said lever being secured to a short rock shaft 64 journaled in said casing and having secured thereto an arm 52 provided with a forked end which receives a pin 53 projecting from a fork or annulus 63 loosely embracing the collar 50, said pin extending through a slot 54 in the casing. The hand lever 51 is preferably provided with a latch lever 55 cooperating with a locking segment 56 on the exterior of the casing. It will be noted that a washer 65 surrounds the transmission shaft 40 and that this washer coacts with the inclined surfaces of the key 48 to depress the latter wholly within the keyway 49 as the collar 50 shifts the key from the position shown in Figs. 4 and 6 to a position for engagement with the lower gear 47, and vice versa, thereby preventing both gears 47 being locked to the shaft 40 at the same time.

It will be understood that the several pairs of gears 46, 47 are designed, respectively, to cause rotation of the shaft 40 at different speeds with respect to the drive rod 12. It will also be understood that the hand lever 51 is operable to move the key 48 to connect any desired gear 47 with the shaft 40 or to move said key into a neutral position in which all of said gears are disconnected from said shaft, this last condition prevailing when the key 48 is opposite the washer or collar 65. The gearing is so proportioned that, when the shaft 40 is rotated, the feed nut or sleeve 37 is rotated at a differential speed with respect to the drive rod 12, thereby causing said drive rod, as it is rotated, to be fed longitudinally with respect to the crosshead 26, and at a speed controlled by the adjustment of the variable or selective gearing 46, 47. It will, furthermore, be understood that, by a suitable adjustment of the inlet valves 30 and 31 and exhaust valves 34 and 35, the piston 19 may be caused to move in the cylinder 18 in either direction, carrying with it the crosshead 26, or may be held stationary therein in any position, thereby holding said crosshead 26 stationary in a corresponding position.

The normal operation of the apparatus, when drilling in a formation composed of relatively hard and soft strata, is as follows: Assuming that a hard stratum is first encountered, the runner, by opening the lower inlet valve 31 and upper exhaust valve 34, moves the piston 19 to the upper end of the cylinder 18, thereafter closing said valves and causing said piston to be retained in that position. The machine is then started, the lever 51 being so adjusted as to connect, with the transmission shaft 40, a suitable one of the gears 47 to produce the required rate of feed, whereupon the screw feeding mechanism will operate to feed the drive rod 12 downwardly as the cut progresses, in the usual manner, as will be understood by those skilled in the art. When the drill passes through the hard stratum and encounters a softer formation, the runner may open the inlet valve 30 and exhaust valve 35, thereby causing a downward movement of the piston 19 to augment or supplement the downward feeding movement of the drive rod caused by the screw feed mechanism, and without interrupting the operation of the latter mechanism. Should another hard stratum be encountered, the valves 30 and 35 may be closed, allowing the screw feed mechanism to operate as before.

From the foregoing it will be seen that, by keeping the inlet valves 30 and 31 and exhaust valves 34 and 35 closed, the hydraulic feeding mechanism is held inoperative in any desired position, permitting the screw feeding mechanism to operate in the ordinary manner. It will also be seen that, by moving the hand lever 51 into its neutral position, so as to disconnect all of the gears 47 from the shaft 40, the hydraulic feeding mechanism may be employed alone through a suitable manipulation of the inlet and exhaust valves.

Screw feeding mechanism and hydraulic feeding mechanism have certain recognized advantages, respectively, for use in drilling operations in different classes of work. It will be seen that the present invention provides a construction whereby these advantages are combined in a single apparatus, making it possible for the runner to employ either type of feed, in accordance with the requirements, to the exclusion of the other, thereby enabling a single machine to operate under conditions heretofore requiring two separate machines. It will also be seen that, by virtue of the fact that either or both of the feeding devices may be operated at will, the machine herein shown and described is capable of working in formations consisting of alternate hard and soft strata with an efficiency greatly superior to that possible with either of the types of machine heretofore generally used, since the hydraulic mechanism may be rendered operative to supplement or augment the action of the screw mechanism when desirable, thereby taking advantage of every possibility of a more rapid feed as it occurs. While I have in this application specifically described one form which my invention may assume in practice, it will be understood that this form of the same is shown for purposes of illustration and that the invention may be modified and embodied in other forms without departing from its spirit or the scope of the appended claims.

What I claim as new as desire to secure by Letters Patent is:

1. In a drilling apparatus, a drive rod, means for simultaneously rotating said rod and moving it longitudinally, and means for moving said rod longitudinally independently of its rotation, said means being each operable independently of the other or operable simultaneously to augment the rate of said longitudinal movement.

2. In a drilling apparatus, a drive rod, means for simultaneously rotating said rod and moving it longitudinally, and means for moving said rod longitudinally independently of its rotation, said means being each operable independently of the other and operable successively to augment the distance of said movement.

3. In a drilling apparatus, a drive rod, means for simultaneously rotating said rod and moving it longitudinally, and means for moving said rod longitudinally independently of its rotation, said means being each operable independently of the other or operable together, the one to augment the rate of the movement accomplished by the other or to reverse the direction of movement while the other continues to operate.

4. In a drilling apparatus, a drill feeding device comprising a rotating drive rod, means controlled by the rotation thereof for effecting longitudinal movement thereof, and means independent of the rotation thereof for effecting longitudinal movement thereof.

5. In a drilling apparatus, a drill feeding device comprising a relatively stationary frame member, a rotating drive rod mounted thereon, means for rotating said rod mounted on said frame, means controlled by the rotation of said rod for effecting longitudinal feed thereof, and means mounted on said frame for moving said rod longitudinally independently of the rotation thereof.

6. In a drilling apparatus, a drill feeding device comprising members movable longitudinally relative to each other and having a definite feeding capacity irrespective of such movement, a second drill feeding device also comprising members longitudinally movable relative to each other, said second device being operable independently of feeding operation of said first device to effect feeding, and means for controlling said devices for operation separately or together.

7. In a drilling apparatus, a drill rod, a power actuated drill rod feeding device comprising relatively movable members, means for connecting one of said members with said rod, and a second power actuated device for feeding said drill rod, said means constituting a connecting means between said second device and said rod and being bodily movable with said rod on operation of said second device.

8. In a drilling apparatus, a drill rod, a drill rod feeding device comprising members movable with respect to each other in a direction longitudinally of said rod during feed and while the feed accomplished thereby remains unchanged, and means for connecting one of said members with said rod comprising a nut threadedly connected with the drill rod.

9. In a drilling apparatus, a fixed support, a drill feeding device, and means carried by said support for moving said device to and holding it in a plurality of positions.

10. In a drilling apparatus, a fixed support, a drill feeding device, and means carried by said support for holding the said device in a plurality of positions or for augmenting the feeding device.

11. In a drilling apparatus, a drill feeding device having a given range of movement for advancing a drilling tool, and means for extending the range of movement of said feeding device.

12. In a drilling apparatus, a drill feeding device having a given range of movement for advancing a drilling tool, and means for extending the range of movement of said feeding device, said means being operative independently of said feeding device to advance the drilling tool.

13. In a drilling apparatus, a drill feeding device having means for advancing a drill steel, and means for varying the rate of advancement of the drill steel independently of the operation of said feeding device.

14. In a drilling apparatus, the combination with a drill feeding mechanism having a predetermined maximum rate of feed, of a second drill feeding mechanism operative to supplement the rate of feed of said first named feeding mechanism.

15. In a drilling apparatus, the combination with a drill rod and drill feeding mechanism operative to feed the same at a plurality of different maximum rates, of a second drill feeding mechanism operative to supplement the rate of feed accomplished by said first named feeding mechanism.

16. In a drilling apparatus, in combination, a screw feeding device, variable speed gearing for driving said feeding device, and a supplementary feeding mechanism for augmenting the action of said screw feeding device.

17. In a drilling apparatus, the combination with screw feeding mechanism, of hydraulic feeding mechanism operative to supplement the action of said screw feeding mechanism.

18. In a drilling apparatus, in combination, a screw feeding device, variable speed gearing for driving said feeding device, and a hydraulic feeding mechanism operative to supplement the action of said screw feeding device.

19. In a drilling apparatus, a plurality of simultaneously or independently operative feeding mechanisms.

20. A drilling apparatus having a plurality of feeding mechanisms, said apparatus having provision for rendering operative either or both of said mechanisms.

21. In a drilling apparatus, a screw feeding mechanism and a hydraulic feeding mechanism, said feeding mechanisms being simultaneously or independently operative.

22. In a drilling apparatus, in combination, a screw feeding mechanism, a hydraulic feeding mechanism, and manually controlled devices for rendering operative at will either or both of said mechanisms.

23. In a drilling apparatus, the combination with a plurality of feeding mechanisms, one of which is adapted to extend the range of feed provided by the operation of the other, of manually adjustable devices for rendering operative at will either or both of said mechanisms, and for controlling the operation of each.

24. In a drilling apparatus, the combination with a plurality of feeding mechanisms, of separate manually operated devices for controlling each of said feeding mechanisms without operating the other and while leaving the other capable of instant operation.

25. In a drilling apparatus, in combination, a screw feeding device, a hydraulic feeding mechanism, manually controlled variable speed gearing for driving said screw feeding device, and manually operable valvular controlling means for said hydraulic feeding mechanism.

26. In a drilling apparatus, in combination, a cylinder, a piston therein, independent feeding devices carried by one of said elements, and a drive rod operatively connected with said feeding devices.

27. In a drilling apparatus, in combination, a cylinder, a piston therein, a piston rod connected to said piston, a head carried by said piston rod, independent feeding devices on said head, and a drive rod operatively connected with said feeding devices.

28. In a drilling apparatus, in combination, a cylinder, a piston therein, a head carried by one of said elements, a drive rod arranged concentric with said cylinder and piston and extending through the same, and independent feeding devices on said head operatively connected with said drive rod.

29. In a drilling apparatus, in combination, a cylinder, a piston therein, a drive rod arranged concentric with said cylinder and piston and extending through the same, a pair of piston rods connected to said piston, a crosshead carried by said piston rods, and independent feeding devices on said crosshead operatively connected with said drive rod.

30. In a drilling apparatus, in combination, a swivel head, feeding mechanism supported by said swivel head and comprising a cylinder and a piston therein, a crosshead carried by one of said last named elements, independent feeding devices on said crosshead, and a drive rod operatively connected with said feeding devices.

31. In a drilling apparatus, in combination, a swivel head, a cylinder carried by said head, a piston in said cylinder, a piston rod connected to said piston, a crosshead carried by said piston rod, independent feeding devices on said crosshead, and a drive rod operatively connected with said feeding devices.

32. In a drilling apparatus, in combination, a cylinder, a piston therein, a head carried by one of said elements, a threaded drive rod, a feed nut carried by said head and cooperating with said threaded drive rod, means for rotating said drive rod, and mechanism for rotating said nut with respect to said rod.

33. In a drilling apparatus, in combination, a cylinder, a piston therein, a head carried by one of said elements, a threaded drive rod arranged concentric with said cylinder and piston and extending through the same, a feed nut on said head cooperating with said threaded drive rod, means for rotating said drive rod, and mechanism for rotating said nut with respect to said rod.

34. In a drilling apparatus, in combination, a support, feeding mechanism carried by said support and comprising a cylinder and a piston therein, feeding devices carried by one of said last named elements, a drive rod operatively connected with said feeding devices, a transmission shaft arranged parallel to said drive rod for actuating said feeding devices, and gearing carried by said support and operatively connecting said transmission shaft and drive rod.

35. In a drilling apparatus, in combination, a support, feeding mechanism mounted on said support and comprising a cylinder and a piston therein, a head carried by one of said last named elements, a threaded drive rod, means for rotating said drive rod, a feed nut on said head cooperating with said threaded drive rod, gearing on said head for rotating said nut with respect to said drive rod, a transmission shaft arranged parallel to said drive rod for actuating said gearing, and transmission mechanism carried by said support and operatively connecting said transmission shaft and drive rod.

36. In a drilling apparatus, in combination, a support, feeding mechanism mounted on said support and comprising a cylinder and a piston therein, feeding devices carried by one of said elements, a drive rod journaled in said support and operatively connected with said feeding devices, means for rotating said drive rod, a transmission shaft arranged parallel to said drive rod for actuating said feeding devices, said shaft being journaled in and movable within said support, and gearing carried by said support and having a splined connection with said transmission shaft for operatively connecting said shaft and drive rod.

37. In a drilling apparatus, in combination, a support, feeding mechanism mounted on said support and comprising a cylinder and a piston therein, feeding devices carried by one of said last named elements, a drive rod journaled in said support and operatively connected with said feeding devices, means for rotating said drive rod, a transmission shaft arranged parallel to said drive rod for actuating said feeding devices, and variable speed gearing carried by said support and operatively connecting said shaft and rod.

38. In a drilling apparatus, in combination, a support, feeding mechanism mounted thereon and comprising a cylinder and a piston therein, feeding devices carried by one of said last named elements, a drive rod journaled in said support and operatively connected with said feeding devices, means for rotating said drive rod, a transmission shaft arranged parallel to said drive rod, a friction device operatively connecting said shaft and feeding devices, and transmission devices carried by said support and operatively connecting said shaft and rod.

39. In a drilling apparatus, in combination, a cylinder, a piston therein, independent feeding devices carried by one of said elements, a drive rod operatively connected with said feeding devices, and independent supply and exhaust valves for the opposite ends of said cylinder respectively.

40. In a drilling apparatus, in combination, a screw feeding device, means including a friction device for driving said feeding device, and a supplementary feeding mechanism for augmenting the action of said screw feeding device.

41. In a drilling apparatus, in combination, a threaded driving rod, means for feeding the same including a cylinder and piston, a second means for feeding the same including rotating members operative respectively to rotate the drive rod and rotatable relative thereto, and extensible driving connections connecting said rotating members, one of said rotatable members being mounted in stationary relation to said cylinder and another with respect to said piston.

42. In a drilling apparatus, in combination, a rotatable drive rod, a cylinder, a piston therein operative to effect feed of said drive rod, rotatable elements cooperating with said drive rod to effect feeding thereof irrespective of the operation of said cylinder and said piston, one of said rotatable members being carried by said cylinder and another by said piston, and means for maintaining them in connected driving relation.

43. In a drilling apparatus, a rotatable driving rod, a cylinder, a piston therein adapted to move said drive rod longitudinally, and rotary feeding means for said drive rod comprising elements connected respectively to said cylinder and to said piston.

44. In a drilling apparatus, in combination, a drive rod, a cylinder having a piston therein coaxially arranged with respect to said drive rod, said piston having a connection with said drive rod and being operative to feed the same, and mechanical feeding means cooperating with said drive rod including rotary elements disposed at opposite ends of said cylinder.

In testimony whereof I affix my signature.

HARRY C. JOHANSEN.